United States Patent Office 3,542,888
Patented Nov. 24, 1970

3,542,888
PRODUCTION OF ETHYNYL BENZENES
Pierre Marie Joseph Ghislain de Radzitzky d'Ostrowick and Alain Joseph Guillaume de Roocker, Brussels, Belgium, assignors to Labofnia, Soc. An., Brussels, Belgium, a corporation of Belgium
No Drawing. Filed Oct. 7, 1968, Ser. No. 765,665
Int. Cl. C07c 1/30, 15/02
U.S. Cl. 260—668          14 Claims

ABSTRACT OF THE DISCLOSURE

Ethynylbenzene compounds having the formula

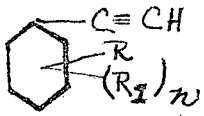

wherein R is ethynyl or hydrogen and $R_1$ is a member of the group consisting of alkyl having 1 to 3 carbon atoms, hydrogen and halogen, and $n$ is an integer of 1 through 4, are formed by dehydrohalogenation of the corresponding alpha-beta dihalo ethylbenzene compound in which the halo is chlorine or bromine, preferably bromine, in a high boiling aliphatic diol solution of alkali metal hydroxide, preferably potassium hydroxide, used in substantial excess, producing a suspension of alkali metal halide, preferably potassium bromide, the reaction medium being maintained at a temperature and pressure at which the ethynyl compound produced is vaporized together with steam as a steam distillate, and the resulting suspension of alkali metal halide in the diol is separated by filtration and washing with a lower alkanol, and a series of batch reactions of this procedure are carried out by fortifying the alkanol washing of the alkali halide filter cake with a replenishing quantity of excess alkali metal hydroxide and returned to the diol solution, the lower alkanol and water being then removed by distillation to regenerate the diol reaction medium ready for the reaction with the next batch. The method may also be modified for reaction on a continuous basis.

This invention relates to preparation of mono- and diethynyl benezene compounds of the formula:

(a)

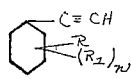

wherein R is ethynyl or hydrogen and $R_1$ is a member of the group consisting of alkyl having 1 to 3 carbon atoms, hydrogen and halogen, and $n$ is an integer of 1 through 4. The alkyl may be methyl, ethyl, propyl and isopropyl, and the halogen may be chlorine, fluorine, bromine and iodine. These compounds are particularly useful in the preparation of polymers having good heat stability.

While numerous methods have been proposed in the art for the preparation of 1-ethynyl compounds including other 1-aliphatic alkynes by various procedures, the present method is outstanding in several aspects.

In its broadest aspect the present method is directed to the production of the mono- and diethynyl benzene compounds as defined above by dehydrohalogenation of the corresponding alpha, beta-dihalo mono ethylbenzene or di(dihaloethyl) benzene compounds with alkali hydroxide dissolved in a high boiling diol, with substantially complete recovery of the alkali halide formed, recovery of the solvent used and production of the ethynyl benzene compound in high purity and high yield.

The corresponding starting dihalo ethylbenzene compound before dehydrohalogenation has the formula:

(b)

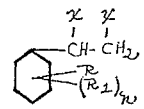

wherein R may represent hydrogen or an alpha-beta dihaloethyl radical and $R_1$ and $n$ are the same as in Formula a above, and X is chlorine or bromine. Such compounds are made by halogenation of the corresponding monovinyl or divinyl compound with chlorine, or preferably, bromine.

More specifically, according to the present invention, the dehydrohalogenation of the mono-dihalo ethylbenzene or di(dihaloethyl) benzene compound is effected by adding the dihaloethyl benzene compound to a heated diol having dissolved therein a substantial excess, preferably about a 50% excess, of alkali metal hydroxide above the dehydrohalogenation stoichiometric equivalent while simultaneously introducing steam or water into the heated and agitated suspension maintained under reduced pressure and at a temperature only high enough to volatilize the ethynyl compounds as formed, together with the water or steam from the reaction medium as a steam distillate. This volatile product is condensed and the ethynyl compound is separated from the water. The reaction is usually carried out batchwise with agitation; but, as will be apparent to one skilled in the art, the method can be made continuous. In any case, the separated condensed water is recycled to the reaction mixture for continued steam distillation of the ethynyl compound as formed.

For initiating the reaction the high boiling solvent diol has added thereto the alkali metal hydroxide as a lower alkanolic solution thereof, the alkali being at least in quantity sufficient to complete the reaction intended, while maintaining a very substantial alkali metal hydroxide excess in the reaction mixture. The lower alkanolic diol solution of alkali is then heated preliminarily to distill off the lower alkanol, and then, after heating to steam distillation temperature, usually in the range of 50 to 120° C., at reduced pressure, the alpha-beta-dihalo ethylbenzene compound is introduced with agitation and with the simultaneous introduction of water or steam, and the reaction is thus continued to completion, flashing off the mono or diethynyl benzene compound with the steam continuously as formed.

Following completion of the reaction, the alkali metal halide formed separates into an insoluble suspension in the diol, and is easily filtered free of the diol, and the filter cake is then given a simple wash with a lower alkanol such as dry methanol in which the alkali is relatively soluble and washed free from the halide in which the alkali metal halide is substantially insoluble. Thus, by this simple, lower, dry alkanol wash, the alkali metal halide becomes easily recovered along with the solution of caustic potash, both in separated, relatively pure form. The relatively pure, wet, cake of alkali metal halide may be treated for regeneration of the halogen and reused. Particularly in the case of bromine, which is preferred for easier handling and is economically valuable, the method allows substantially complete recovery of the bromine for reuse in forming more alpha-beta-dibromo ethylbenzene compound or alpah-beta-di(dibromoethyl) benzene compound as defined above for further dehydrohalogenation to the corresponding mono or diethynyl benzene compound.

Simultaneously, the wash alkanol containing caustic potash removed from the alkali metal halide cake, needs merely to have more caustic potash added thereto for return to the diol solvent for preparing the solvent for carrying out the next batch reaction of the dehydrohalogenation.

For reasons of solubility, it is preferred only the alpha-beta-dichloro or dibromo monoethyl or diethylbenzene compounds be used in a dehydrohalogenation, according to the present invention, although other halogen types may be present in the molecule, according to the formula given above, unaffected by this reaction.

While any of the alkali metal hydroxides such as sodium hydroxide, lithium hydroxide, or potassium hydroxide may be used as alkali, it is generally preferred to use potassium hydroxide for its relatively better solubility in the lower alkanol and diol, whereby the potassium hydroxide is most easily recovered in the alkanolic wash of the alkali metal halide. The lower alkanol may be dry methanol, ethanol, propanol or isopropanol.

Inasmuch as in a batchwise reaction bromine is more easily handled as a dropwise liquid halogenation of corresponding starting vinyl compounds, and that halogen adds cleanly, the bromine is much preferred. Full recovery of the alkali bromide formed becomes important from the aspect of the economy of the reaction. Potassium bromide is substantially insoluble in the lower alkanol, in contrast to relatively high solubility of the caustic potash, and consequently the reaction is far more economic using caustic potash as the alkali, and the dibromide is used as the halogen for selecting the alpha-beta-dihalo ethylbenzene compound to be dehydrohalogenated.

Moreover, it is believed that by the combination of steps—the selection of the dibromide as the dihalo ethylbenzene compound starting material, and the use of caustic potash for dehydrohalogenation thereof—allows the reaction to run very easily at unusually low temperatures, such as below 120° C., and very efficiently with stirring, under reduced pressure, and recycling of reaction water, with minimum losses of the starting compound by prepolymerization to tars and with consequent high yields.

An important economy, moreover, is that almost no solvent is lost. The lower alkanols, preferably methanol or ethanol, used to wash the removed potassium bromide or chloride for which it has low solubility, recovers what potash is present efficiently, and thus is a useful solution to which more caustic potash may be added, the solution being returned to the reaction mixture for fortifying the diol with the necessary excess quantity of potash; and the reaction is run again under the disclosed conditions of high yield and efficiency.

Thus, once the formed alkali halide has been removed from the reaction solvent, it is possible to fortify the solvent with fresh alkali hydroxide either directly or better by first dissolving it in water or in the alkanol which has been used for rinsing the alkali halide cake, uniting the solutions, eliminating substantially water and/or methanol by distillation at a temperature not higher than that of reaction, possibly under a reduced pressure, and then starting a new dehydrohalogenation.

Various diols may be used such as ethylene glycol, propylene glycol, butylene glycol and preferably diethylene glycol, which is found to be an excellent solvent for this purpose, for ready acceptance of the potash and release of relatively pure alkali halide insoluble therein.

The operation of this method is surprising for preparation of ethynyl benzene compounds of the above formula since the intermediate alpha-halo vinylbenzene simultaneously formed during the dehydrohalogenation is so highly unstable that it tends excessively to form polymeric tars by other known methods of forming 1-alkynes. Moreover, it is particularly unexpected since an ethynyl benzene compound, as defined above, is generally far higher boiling than the aliphatic alkynes typically produced in the art and requires processing at correspondingly high temperatures. For instance, monoethynyl benzene hereof boils at 143° C. in contrast to acetylene which boils at −83.6° C.; propyne which boils at −23° C.; or pentyne-1 which boils at 40° C. It would be obviously expected that little more than polymeric tars would be available by dehydrohalogenation of either alpha-beta-dihalo ethyl or alpha-beta-dihalo-diethylbenzene at a volatilizing temperature, according to the present method.

This procedure is useful to prepare such compounds as ethynyl benzene, o-ethynyl toluene, ethynyl xylenes, diethynyl benzenes, diethynyl toluenes, diethynyl xylenes, para-isopropylethynyl benzene, meta-ethynyl chlorobenzene, meta-ethyl ethynylbenzene and the like.

The reaction medium is prepared by first dissolving the alkali hydroxide, preferably potassium hydroxide, in the range of 20 to 50% molar excess, based upon the compound to be dehydrohalogenated, in a small volume of water or of a lower alkanol, preferably methanol. This solution, after cooling, is then run into the reaction solvent diol such as glycol and, preferably diethylene glycol. It will be noted that this solvent boils at least 20° C. higher than the ethynyl substituted aromatic compound being prepared. The water and lower alkanol is first evaporated from the diol solution substantially to completion at a temperature not exceeding 120° C. under reduced pressure, obtaining a solution containing at least 5 mols of alkali hydroxide per liter. An absolutely anhydrous solvent is not essential to the process. To this alkaline diol solution there is then added, at once when working in batches, the halogenated compound. The reaction vessel is stoppered and efficient stirring is begun. An exothermic reaction rapidly sets in and the temperature is controlled between 50 and 120° C., usually being around 70° C. for dehydrohalogenation of dibromo compounds, and around 100° C. for dichloro compounds. The gradual lowering of the pressure allows the reaction water and some hydrocarbon to distill. When the initial exothermic reaction slows down, external heating is applied to keep the reaction mixture at the desired temperature and the pressure is reduced to a value corresponding to allow fast distillation of the ethynyl-substituted aromatic compound formed. The hydrocarbon is continuously evolved together with the reaction water. Both are condensed and collected in a receiver that is efficiently cooled in order to condense them as completely as possible under the reduced pressure, usually maintained below about 40 mm. Hg, preferably below about 30 mm. Hg. When the evolution of hydrocarbon slows down, the distilled reaction water is separated from the usually supernatant acetylenic compound and is reintroduced dropwise in the reaction vessel in order to steam distill the residual hydrocarbon. This operation is continued until substantially no more hydrocarbon is carried away with water. Under these conditions, any solvent that may have distilled is returned to the reaction vessel owing to the preferential solubility of the water miscible solvent in water. The full recovery of solvent is another characteristic feature of the present invention.

The reutilization of the solvent and the recovery of the alkali halide as stated, are most important to the economy of this method. For this purpose about an equal volume of a lower alkanol, preferably methanol, is added with stirring to the reaction vessel after completion of the reaction, preferably at ambient pressure and temperature in order to lower the viscosity of the slurry of insoluble alkali halide resulting from the reaction and to redissolve any precipitated alkali hydroxide. The whole slurry is then filtered or centrifuged and the cake of crude alkali halide is washed with portions of the same alkanol until neutral. These washings allow substantially quantitative recovery of any unreacted alkalihydroxide and alkali halide. On some occasions it may be advisable to make a final wash of the cake with benzene or other similar solvents which are not solvents for the alkali halides but good solvents for tars or polymers. When benzene is used, this final rinse is kept apart from the alkanol wash and the benzene solvent may be reclaimed from the tars separately by distillation. It is then always possible to obtain a perfectly pure alkali halide free of alkali hydroxide and of any organic contaminant without need for further crystallization or purification. The combined reaction mother liquors and the alkanol washings contain the total excess of alkali hydroxide. For performing the next cycle of dehydrohalogenation an equimolecular quantity of the same alkali hydroxide is then added to the high boiling mother liquor of the last reaction, the alkali being similarly dissolved in water, or preferably in a lower alkanol and still more preferably in methanol, the solution being combined with the alkanolic mother liquors coming from the separation and from the washings of the alkali halide cake. The whole reaction medium solution is then submitted to distillation at a temperature not exceeding 100° C., sometimes as desired under reduced pressure, until the reaction solvent is free of water and/or of alkanol.

The recovered alkanol, preferably methanol, is reused for the same operations during each ensuing cycle. The reaction medium thus is replenished from batch to batch to contain about 20 to 50% molar excess of hydroxide, which excess is necessary for the achievement of a rapid and complete reaction, but which is not necessarily limited to those values.

The next dehydrohalogenation cycle may then be started by the addition of another quantity of the dihalo ethylbenzene compound. The ethynyl compound obtained in the first cycle is redistilled and a small amount of heavy bottoms obtained in the redistillation is returned together with the fresh halogenated compound to the next cycle.

Although ethylene glycol may be used as a solvent in this process, it has unexpectedly been found that diethylene glycol always affords a superior yield and is therefore preferred. We have found that the starting halogenated compounds are always more soluble in diethylene glycol than in glycol and appears to account for this unexpected fact.

As mentioned earlier, we prefer to dehydrohalogenate dibromides compared with dichlorides because the bromination of the starting olefin is always much cleaner and selective compared with chlorination. Furthermore, dehydrobromination gives generally a higher yield than dehydrochlorination and the reaction can be carried out at a lower temperature.

Although sodium hydroxide may be used with some success in the process of the present invention, potassium hydroxide is definitely preferred for solubility reasons. It is a characteristic feature of this invention to provide for a reaction medium which permits a large amount of alkali hydroxide to be maintained in solution and a very small amount only of the corresponding alkali halide to remain dissolved in the reaction solution in order to facilitate its recovery. It is also essential that the alkali halide be as sparingly soluble as possible in the lower alkanol which is used for washing the cake and that the corresponding alkali hydroxide be highly soluble in the same solvent.

Although sodium hydroxide and potassium hydroxide are both fairly soluble in glycol, diethylene glycol, methanol and ethanol, the use of potassium hydroxide is to be preferred because potassium bromide is about 2.5 times less soluble in the reaction solvent and 8 to 10 times less soluble in the washing solvent. The same advantage is kept when working on chlorinated compounds instead of brominated compounds because potassium chloride is even less soluble in the above-mentioned solvents.

The invention may be illustrated by the following examples:

EXAMPLE I 39.6 grams of commercial potassium hydroxide, corresponding to 33.6 grams of pure potassium hydroxide, or 0.6 mol, 50% molar excess, were dissolved in 30 ml. of distilled water. The cooled solution is added with stirring to 100 ml. of diethylene glycol. The water is then rapidly distilled off under vacuum and, to the remaining 6 mols per liter of solvent solution is rapidly added, at a temperature below about 60° C., 52.8 grams (0.2 m.) of alpha-beta-dibromo ethylbenzene. The flask is closed, vigorous stirring is started, and the pressure is progressively reduced to below 30 mm. Hg in such a way that the exothermic reaction is controlled by the regular distillation of both the reaction water released and of phenylacetylene, so that the reaction temperature is maintained between 65° and 75° C. The water and phenylacetylene distill regularly over a period of about two hours after which time some of the reaction water, decanted from the condensed distillate, is reintroduced dropwise, in order to steam distill the remaining phenylacetylene. The hydrocarbon layer of the distillate is washed with water and redistilled. A yield of 15.2 grams of phenylacetylene (74.5%) is thus obtained. The bottoms of the distillation are stored and returned to the reaction flask during the next cycle together with a fresh charge of dibromo ethylbenzene. The residue of the reaction is a slurry of potassium bromide and excess potassium hydroxide in the solvent. It is stirred with 100 ml. of methanol, filtered, and the potassium bromide cake is washed with 20 ml. methanol portions until neutral. After drying, a 72.5% yield of the bromide is thus recovered. To the combined mother liquor and methanolic washings are now added 26.4 grams (0.4 mol) (equimolecular quantity) of potassium hydroxide, and the methanol is distilled off under vacuum. To the methanol-free solvent is added a fresh portion of 52.8 grams (0.2 mol) of alpha-beta-dibromo ethylbenzene and the second cycle is then started. The second batch yields 94% of phenylacetylene and 88% of potassium bromide. Additional cycles yield 90 to 95% of phenylacetylene and 90 to 95% of potassium bromide. Alternately, according to this example, the potassium hydroxide is first dissolved in methanol instead of water, with similar results.

EXAMPLE II 39.6 grams (0.6 mol) (50% molar excess) of potassium hydroxide are dissolved in 100 ml. of methanol and the cooled solution is poured with stirring in 100 ml. of diethylene glycol. The methanol is then rapidly distilled off under vacuum and, to the remaining 6 mols per liter of solvent solution is rapidly added at a temperature of 60° C. 45 grams (0.1 mol) of meta-di(alpha-beta-dibromoethyl) benzene. The flask is closed, vigorous stirring is started and the vacuum progressively applied in such a way that the exothermic reaction is controlled by the regular distillation of reaction water and meta-diethynylbenzene. The reaction temperature is thus maintained between 65 and 70° C. The vacuum is lowered as soon as possible after the start of the agitation to about 10 mm. Hg. Water and meta-diethynylbenzene distill off regularly for one hour. After that time from 50 to 100 ml. of reaction water are introduced dropwise in order to steam distill the remaining diethynylbenzene. The water is decanted from the distillate and the hydrocarbon layer is once washed with water and redistilled. 8.3 grams of meta-diethynylbenzene or a 66% yield is thus obtained. The bottoms product of the distillation is returned to the reaction flask for the next cycle. The residue of the reaction liquor is a slurry of potassium bromide and excess potassium hydroxide in the solvent. It is stirred with 100 ml. of methanol, filtered, and the bromide cake is then washed with 20 ml. methanol portions until it is neutral. After drying, a 97.5% yield of potassium bromide is recovered. To the combined mother liquors and methanolic washings are added 26.4 grams (0.4 mol) (equimolecular quantity)

of potassium hydroxide, and the methanol is distilled under a reduced pressure to remove it. To the methanol free solvent is then added a fresh portion of 45 grams (0.1 mol) of the tetrabromo diethylbenzene compound, the second cycle then being started. A yield of 77.5% of meta-diethynylbenzene and 91% of potassium bromide is then obtained. Ensuing cycles yield from 75 to 80% of meta-diethynylbenzene and 90 to 93% of potassium bromide. A last washing of the potassium bromide cake with benzene will remove traces of colored organic bodies. Benzene is then recovered by distillation. In order to avoid an excessive thickening of the slurry, it is convenient, beginning with the third cycle, to add only the amount of potassium hydroxide corresponding to the amount of potassium bromide effectively formed in the preceding cycle.

EXAMPLE III

Following the conditions of Example I, except that meta-ethyl-alpha-beta-dibromoethylbenzene is added to the reaction mixture, as the first cycle yields 74% of meta-ethyl phenylacetylene. Ensuing cycles give 90 to 95% yields both for meta-ethyl phenylacetylene and for potassium bromide. Meta-ethyl-phenylacetylene has the following properties: B.P. 66° C./10 mm. Hg; $n_D^{20}$ 1.5391.

EXAMPLE IV

Following the conditions of Example I, except that meta-chloro alpha-beta-dibromoethylbenzene is added to the reaction mixture as the first cycle, a yield of 77% meta-chloro phenylacetylene is obtained. Ensuing cycles give 90 to 99% yields both for the meta-chloro phenylacetylene and for the potassium bromide. This example shows that a halogen atom fixed on the aromatic nucleus is not affected under the conditions of the process.

EXAMPLE V

Following the conditions of Example I, except that para-isopropyl alpha-beta-dibromoethylbenzene is added to the reaction mixture as the first cycle, a yield of 73% of para isopropyl phenylacetylene is obtained. Ensuing cycles give 90 to 95% yields both for para isopropyl phenylacetylene and for potassium bromide.

EXAMPLE VI

This example illustrates that the reaction temperature which is preferably kept between 60 and 75° C. is usefully increased toward a maximum operation temperature of 120° C. when working on sterically hindered molecules. Following the conditions of Example I, except that ortho methyl alpha-beta-dibromo ethylbenzene is added to the reaction mixture as the first cycle, a yield of only 15% of ortho methyl phenylacetylene is obtained and only 43% is obtained for the second cycle. When using a higher reaction temperature of 100° C., a yield of 75% is obtained for the first cycle and a yield of 90 to 95% of ortho methyl phenylacetylene for the following cycles. Such higher reaction temperatures are most advantageously used when dealing with ortho-substituted, sterically hindered compounds. For the same steric hinderance conditions such compounds are less prone to form polymers and the higher temperatures are not detrimental to the reaction.

EXAMPLE VII

This example illustrates the preparations of an ethynyl benzene compound from an alpha-beta dichloro ethylbenzene compound. Following the conditions of Example I except that alpha-beta dibromo ethylbenzene is replaced by 35 grams (0.2 mol) of alpha-beta dichloro ethylbenzene and using a reaction temperature of 100° C. instead of 65 to 75° C., as the first dehydrohalogenation cycle, a yield of 12 grams of phenylacetylene (59%) is obtained. The slurry of potassium chloride is treated exactly as was that of potassium bromide in Example I and 22.7 grams (76% yield) of pure potassium chloride are thus obtained. The second dehydrohalogenation cycle is conducted exactly as in Example I except that the above-mentioned modification of this example is substituted and 16.7 grams of phenylacetylene (82% yield) is thus obtained. A recovery of 25.9 grams (87% yield) of pure potassium chloride is also obtained. The ensuing cycles yield 80 to 90% of phenyl acetylene and 85 to 95% of pure potassium chloride. Yields are always lower than with dibromo compounds probably due to the fact that a higher reaction temperature must be used.

Care must also be paid to the fact that partly dehydrochlorinated compounds boil closer to the final ethynyl compounds than the corresponding partly dehydrobrominated compound and reflux or fractionation of volatiles to and from the reaction vessel is therefore advisable when dehydrohalogenating dichloro compounds.

For those skilled in the art it is obvious that this reaction can be carried out continuously by adding the halogenated compound continuously to the reaction mixture maintained at the reaction temperature and under reduced pressure while continuously distilling the acetylenic compound formed together with water, continuously removing a side stream of the reaction slurry, adding methanol to this slurry, and then filtering off potassium bromide, washing the cake with methanol, fortifying the united solutions with fresh potassium hydroxide, removing methanol by preliminary distillation, and finally adding continuously this fortified solution to the reaction mixture. The operation of the process continuously is therefore within the scope of the present invention.

Accordingly, it is intended that the examples be regarded as illustrative and not limiting except as defined in the claims appended hereto.

What is claimed is:

1. Process for production of ethynylbenzene compounds having the formula

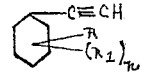

wherein R is ethynyl or hydrogen, $R_1$ is a member of the group consisting of alkyl having 1 to 3 carbon atoms, hydrogen and halogen, n is an integer of 1 through 4, with simultaneous recovery of substantially pure alkali metal halide comprising contacting an alpha-beta dihalo ethylbenzene compound having the general formula

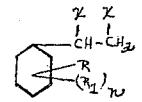

wherein R may represent hydrogen or an alpha-beta dihaloethyl radical, $R_1$ is a member of the group consisting of alkyl having 1 to 3 carbon atoms, hydrogen and halogen, n is an integer of 1 through 4 and X is chlorine or bromine, with a high-boiling aliphatic diol solution containing a substantial stoichiometric excess of alkali metal hydroxide, said solution being maintained at a raised temperature and reduced pressure sufficient to vaporize water and the corresponding ethynylbenzene compound formed as a steam distillate, condensing the vaporized reaction product and water, separating the ethynylbenzene compound reaction product from the water, recycling the water to the reaction medium to continue the steam distillation of the reaction product as formed until the batch has substantially completely reacted, then diluting the reaction medium with a lower monohydroxy alkanol, separating the suspended insoluble alkali metal halide by filtration, washing the alkali metal halide filter cake with additional portions of said lower monohydroxy alkanol to produce a substantially pure alkali metal halide filter cake, and a mother liquor wash solution containing recovered alkali metal hydroxide, adding more alkali metal hydroxide to replenish the alkali metal hydroxide reacted in the batch, combining said alkali metal hydroxide dissolved in lower alkanol with the original diol reaction medium to form the next batch solution containing a similar excess of alkali metal hydroxide, evaporating the volatile lower monohydroxy alkanol content from said diol medium, and adding the next batch quantity of said alpha-beta dihalo ethylbenzene compound to said diol reaction medium and continuing the reaction as the next batch.

2. The method as defined in claim 1 wherein the batch reaction of claim 1 is modified for continuous operation by adding the alpha-beta dihalo ethylbenzene compound substantially continuously to the diol reaction mixture while maintaining said reaction medium at the reacting temperature and under reduced pressure, continuously distilling the corresponding ethynylbenzene compound formed together with water, separating water from said ethynylbenzene compound and continuously returning the water to the reaction medium, continuously withdrawing a side stream slurry of said reaction medium, adding a lower alkanol to said slurry, filtering off suspended alkali metal halide, washing said alkali metal halide filter cake to separate the substantially pure salt with a lower monohydroxy alkanol, continuously replenishing the alkali metal hydroxide excess content in the withdrawn and filtered diol reaction medium, evaporating the lower monohydroxy alkanol from high boiling diol of the said reaction medium, and continuously recycling said diol solution of alkali metal hydroxide to the reaction medium.

3. The method as defined in claim 2 wherein the alkali is caustic potash.

4. The method as defined in claim 3 wherein the alpha-beta dihalo ethylbenzene compound is a dibromide and the alkali metal halide formed is alkali metal bromide.

5. The method as defined in claim 2 wherein the high boiling diol comprising the reaction medium is diethylene glycol.

6. The method as defined in claim 2 wherein the reaction is carried out at a temperature in the range of 50 to 120° C. and at a pressure sufficiently reduced to vaporize the ethynylbenzene compound formed together with water in said temperature range.

7. The method as defined in claim 2 wherein the dihalo ethylbenzene compound is an alpha-beta dihalo ethylbenzene compound of which the halogen is a member of the group consisting of bromine and chlorine, and the reaction temperature is maintained in the range of 60 to 110° C., and a substantially pure ethynylbenzene compound is recovered.

8. The method as defined in claim 2 wherein the alpha-beta dihalo ethylbenzene compound alpha-beta di(dihaloethyl)benzene in which the halogen is a member of the group consisting of bromine and chlorine, and the reaction temperature is maintained in the range of 60 to 110° C., and a substantially pure diethynylbenzene compound is recovered.

9. A method as claimed in claim 2 wherein the halogenated ethylbenzene compound is meta ethyl (alpha-beta dibromoethyl) benzene, the reaction temperature is in the range of 60 to 80° C., and meta ethyl phenylacetylene is obtained together with substantially pure alkali metal bromide.

10. A method as claimed in claim 2 wherein the halogenated ethylbenzene compound is meta chloro (alpha-beta dibromoethyl) benzene, the reaction temperature is in the range of 60 to 80° C., and meta chloro phenylacetylene is obtained together with substantially pure alkali metal bromide.

11. A method as claimed in claim 2 wherein the halogenated ethylbenzene compound is para isopropyl(alpha-beta dibromoethyl) benzene, the reaction temperature is in the range of 60 to 80° C. and para isopropyl phenylacetylene is obtained together with substantially pure alkali metal bromide.

12. A method as claimed in claim 2 wherein the halogenated ethylbenzene compound is ortho methyl (alpha-beta dibromoethyl) benzene, the reaction temperature is in the range of 90 to 100° C. and ortho methyl phenylacetylene is obtained together with substantially pure alkali metal bromide.

13. A method as claimed in claim 2 wherein the halogenated ethylbenzene compound is alpha-beta dichloroethylbenzene, the reaction temperature is in the range of 90 to 110° C., and phenylacetylene is obtained together with substantially pure alkali metal chloride.

14. Meta-ethyl phenylacetylene.

References Cited

UNITED STATES PATENTS 3,300,456   1/1967   Hay et al. _____ 260—88.2

DELBERT E. GANTZ, Primary Examiner

C. R. DAVIS, Assistant Examiner

U.S. Cl. X.R.
260—88.2, 671